United States Patent
Schumacher et al.

(10) Patent No.: US 6,213,394 B1
(45) Date of Patent: Apr. 10, 2001

(54) VISUAL SYSTEM FOR, AND METHOD OF, DISPLAYING GRAPHICS AND ALPHANUMERIC INFORMATION

(75) Inventors: Erick P. Schumacher, Sherman Oaks; Robert J. Freiberg, Thousand Oaks; Larry D. Hatch, Moorpark; Kevin D. Quitt, Canyon Country; Koashin Wu, Temple City, all of CA (US)

(73) Assignee: Industrial Electronic Engineers, Inc., Van Nuys, CA (US)

( * ) Notice: Subject to any disclaimer, the term of this patent is extended or adjusted under 35 U.S.C. 154(b) by 0 days.

(21) Appl. No.: 09/332,834

(22) Filed: Jun. 14, 1999

(51) Int. Cl.[7] .................................................. G06K 15/00
(52) U.S. Cl. ...................................... 235/383; 235/462.43
(58) Field of Search ............................. 235/383, 462.43, 235/375

(56) References Cited

U.S. PATENT DOCUMENTS 5,945,975 * 8/1999 Lundrigan et al. .................. 345/133
6,062,478 * 5/2000 Izaguirre et al. ............... 235/462.47

FOREIGN PATENT DOCUMENTS

11185160 * 7/1999 (JP) .

* cited by examiner

Primary Examiner—Mark Tremblay

(74) Attorney, Agent, or Firm—Ellsworth R. Roston; Fulwider Patton, et al.

(57) ABSTRACT

A visual (e.g. liquid crystal) screen displays a sequence of graphics presentations and a specific event. The graphics sequence (e.g. visual representations of products in a market) has a display priority except when the specific event occurs. The specific event may be in graphics or alphanumeric form and related or unrelated to the graphics sequence. When the specific event has been displayed, the graphics sequence has priority again. In one embodiment, the specific event may be products identified and priced at a checkout counter by a bar code scanner or a keyboard. This information is processed alphanumerically. The processed information is displayed on the screen until the transaction completion (e.g. total purchase price is displayed). After a designated (e.g. 30 seconds) time following the purchase price display, the sequence of graphics presentations resumes display priority. In a second embodiment, the display screen is integrated with a bar code scanner in a housing and is displaced from the checkout counter to advertise a graphics sequence of product promotions in the market and also to provide price information requested by the customer. The display screen also provides a priority to the graphics sequence when there is no interaction with the customer. When the customer desires to price an item, the customer places the item at the scanner window. The scanned alphanumeric information is processed and the processed information (e.g. product description and price) is displayed alphanumerically for the designated time. The graphics sequence thereafter resumes priority unless another item is scanned within the designated time.

37 Claims, 13 Drawing Sheets

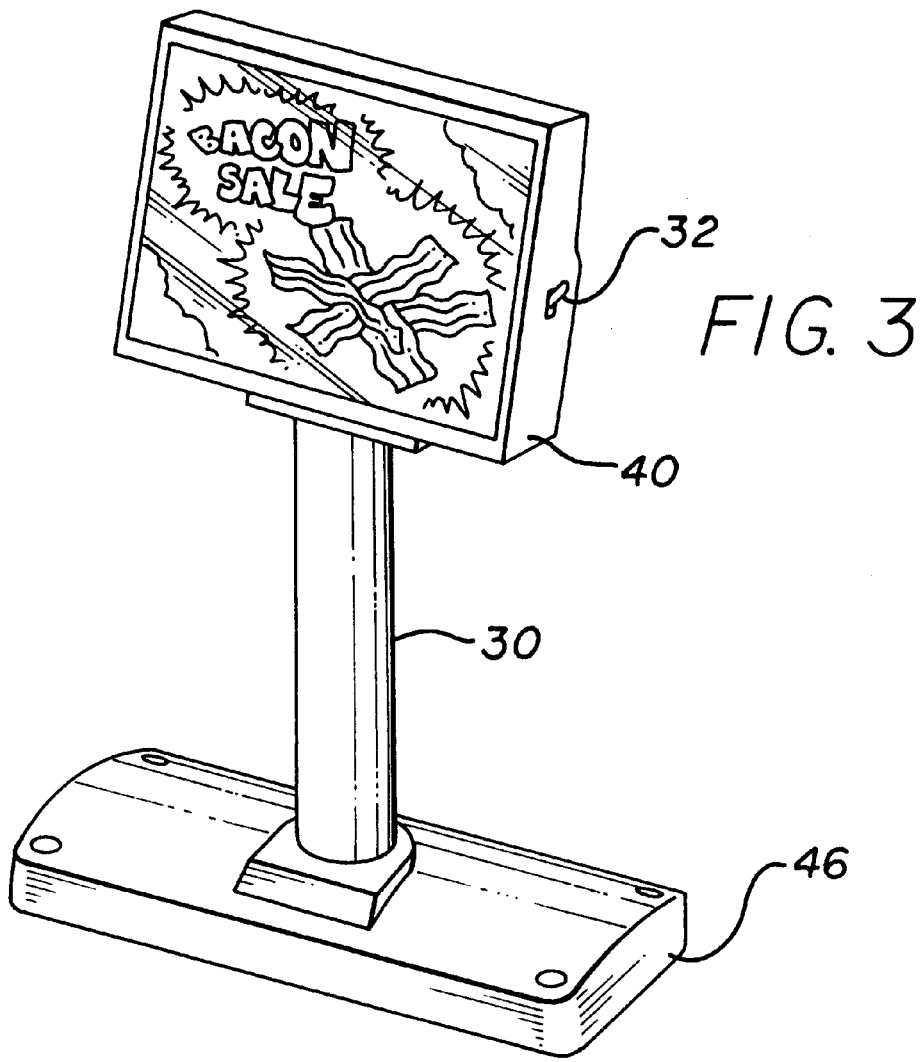
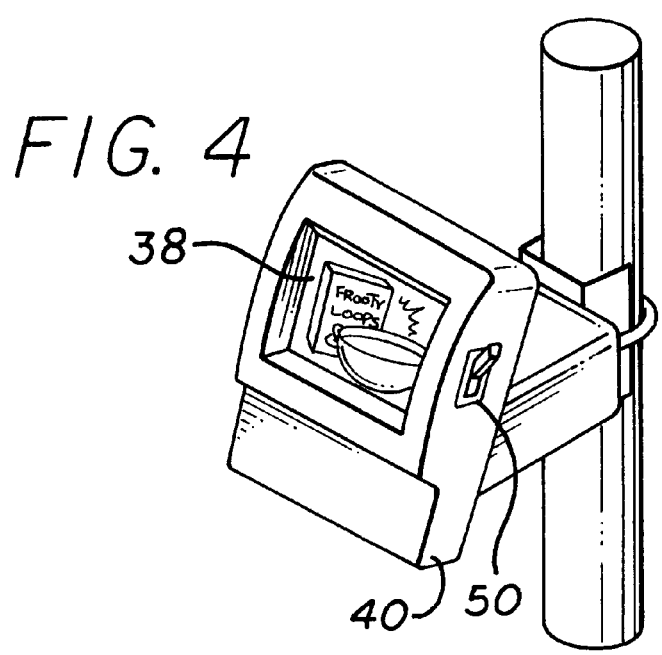

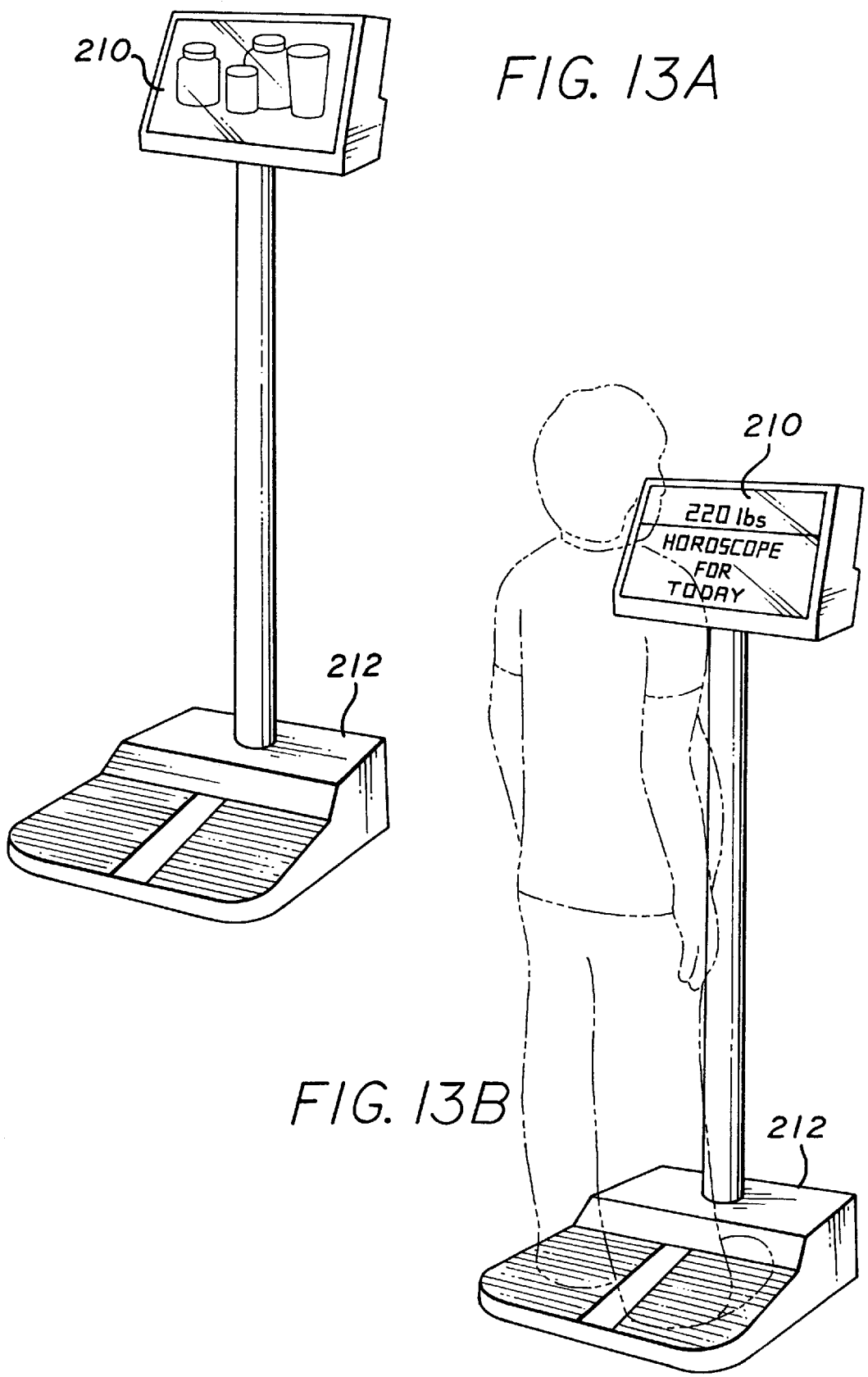

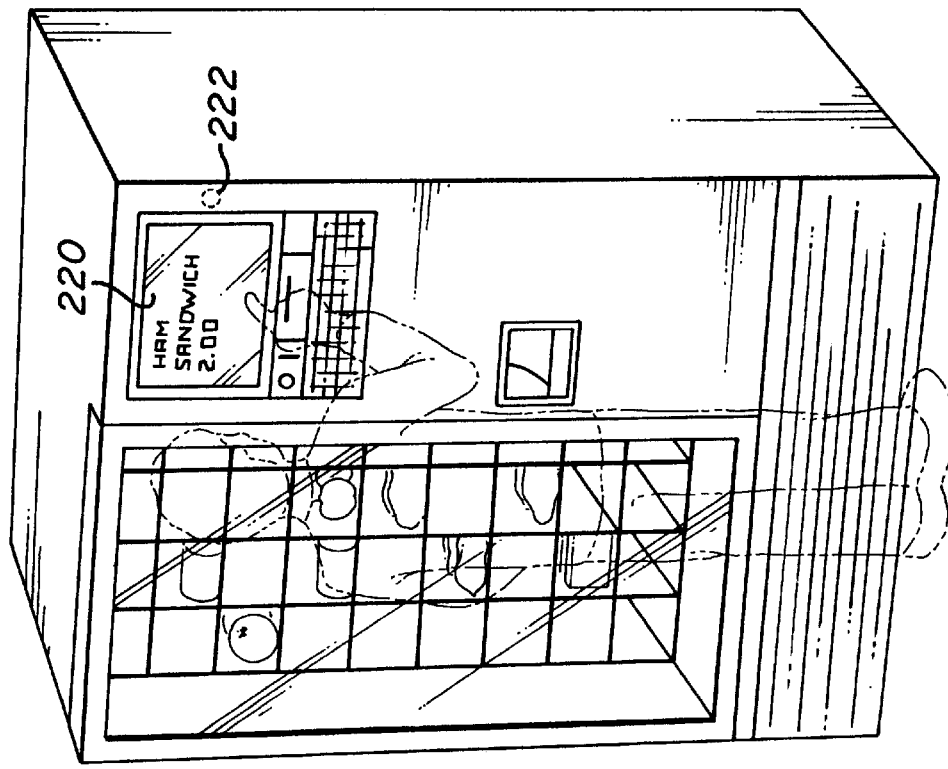
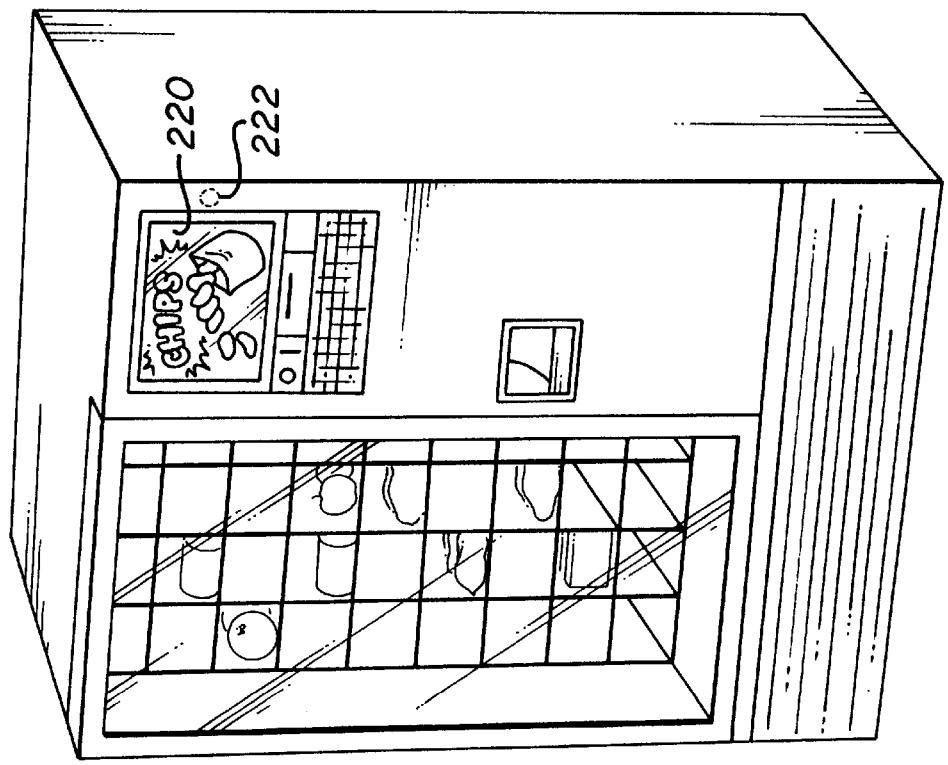

VISUAL SYSTEM FOR, AND METHOD OF, DISPLAYING GRAPHICS AND ALPHANUMERIC INFORMATION

This invention relates to systems for, and methods of, displaying a sequence of graphics presentations and a specific event on a visual display screen. The invention particularly relates to a system for, and method of, normally providing a priority to a display of a sequence of graphics presentations, thereafter providing for a priority to a display of a specific event upon the occurrence of the particular event and then providing again for a priority in the display of the sequence of the graphics presentations after the occurrence and display of the specific event. The specific event may be related or unrelated to the sequence of graphics presentations and the display of the specific event may be graphic or alphanumeric.

The system of this invention provides these added features to a market's existing character-based point-of-sale system without requiring any software or hardware changes to be made in the point-of-sale system by the market. In different embodiments, the systems and methods are adapted to be used in a store or market for providing to a customer visual indications of (1) purchases made by the customer, (2) purchases that the customer is contemplating making and (3) purchases that the retail store would like to induce the customer to make.

BACKGROUND OF THE INVENTION

Visual displays are now provided in retail stores of products and items being purchased by a customer. For example, such visual displays are provided at a checkout counter so that the customer can verify the accuracy of the clerk at the checkout counter in recording, as by entries by a bar code scanner or by a keyboard, the purchases being made by the customer and the prices of such purchases. Such verifications are provided by alphanumeric symbols on the display screen.

It has been considered desirable for some time to be able to provide in a store advertisements of items and products offered by the store. These advertisements may illustratively relate to specials being offered by the store at any time. For example, such advertisements are now being provided by posters prominently displayed in the store. However, only one poster can be allocated at any one time to a given space in the store. This limits the ability of the store to provide a plurality of advertisements in sequence in any one space.

It would be desirable to provide in a store a system in which a sequence of graphic presentations and a presentation of a specific event are displayed at different times in a given location, the sequence of graphics presentations being provided at first times to indicate advertisements and promotions and the information, preferably alphanumeric, relating to specific events being provided at second times to specify products and the prices of such products. It would be further desirable to display the sequence of graphics presentations and the specific event at different times on a single visual display screen in the store or in some cases simultaneously on the screen. For example, the sequence of graphics presentations may relate to specials being offered in a store or market and the specific event may relate to the description to the description of a specific product and the price of the product in the store or may relate to an alphanumeric identification of a plurality of products being purchased by a customer, the prices of such products and the total cost of all of the products.

BRIEF DESCRIPTION OF THE INVENTION

A visual (e.g. liquid crystal) screen displays a sequence of graphics presentations and a specific event. The graphic information may be presented in a variety of formats (e.g. scrolled static pictures, animated imagery, full video, etc.). The graphics sequence (e.g. visual representations of products in a market) has a priority for display except when the specific event occurs. The specific event may be in graphics or alphanumeric form and related or unrelated to the graphics sequence. When the specific event has been displayed, the graphics sequence has priority again.

There are a number of embodiments of this invention. In a first embodiment of the invention, a visual display screen may be disposed at a checkout counter in a store to provide visual displays to a customer waiting to purchase products. When the visual display screen is indicating purchases being made by a customer, it provides alphanumeric indications identifying the purchases and the prices of such purchases. At other times, when purchases are not in progress the visual display screen provides graphics (pictorial) information of product advertisements and special promotions being sponsored by the store. Other display units, all of which may be networked together, may be located in areas other than the checkout counter. These display units do not display transaction data and only display promotional graphical images.

In the first embodiment, the alphanumeric information may be provided at a checkout counter by a bar code scanner or a keyboard which are part of the cash register system. In either case, the alphanumeric information is transferred to a centrally disposed transaction processor. The alphanumeric information processed by the central processor is displayed on the display screen until the purchase transaction is completed. At that time, the graphics advertising information resumes priority for display on the screen.

In a second embodiment of the invention, the visual display screen is integrated with a bar code scanner and is provided at a strategic location in the store other than the checkout counter to advertise products and promotions in the store. The screen provides a priority to graphics advertising information. When a customer activates the bar code scanner by placing a bar code under the scanner to obtain price information concerning a specific product, the visual display screen provides alphanumeric indications identifying the specific product in the store and the price of such product. The alphanumeric information from the scanner is processed at the central processor and the processed information is displayed at the screen for a designated time (e.g. 30 seconds). The screen thereafter displays the graphics information unless alphanumeric information on another product is scanned by the scanner within the particular time. It is also possible for the unit to have the information local to itself and updated periodically, but the server-based method is more typical. During the majority of the operational time, the visual display screen provides graphics (pictorial) information of product advertisements and special promotions being sponsored by the store. Other display units of this embodiment, all of which may be networked together, may be situated at various locations throughout the store. These units exhibit graphical data except when their individual bar code scanners are activated.

In the two (2) embodiments discussed above, the sequence of graphics presentations may constitute advertisements or promotions of items or products offered in a store or market. In the first embodiment, the specific event may constitute a list of items or products disposed at a checkout counter for purchase by a customer and displayed on a visual display screen in alphanumeric form at the checkout counter. In the second embodiment, the sequence of graphics presentations may be the same as in the first embodiment and the specific event may be a single item that a customer is interested in purchasing in the store or market and that is displayed in alphanumeric form on the visual display screen. In both embodiments, there is some interrelationship between the sequence of graphics relationships and the specific event in that they both relate to items of merchandise in the store.

A major advantage of the system is that graphics information capability can be added to the store's presently existing alphanumeric visual display system without any hardware/software changes except for the visual display unit itself. Another advantage of such a system is the simplicity of the system in that only a single display screen is used to provide (a) a sequence of the graphics presentations and (b) a specific event, preferably in alphanumeric form. Still another advantage is that many of the components and sub-systems in the graphics and alphanumeric portions of the system are shared. A further advantage is that the use of a single display screen for graphics and alphanumeric information frees a number of locations in the store to provide graphics and alphanumeric displays individual to such locations. For example, the graphics displays of the meat section of a market can be different from the graphics displays of the produce section of the market. To emphasize the point once again, an important advantage is that the embodiments of this invention are compatible with previously installed point of sale (POS) systems and existing managed information systems (MIS).

A number of additional embodiments of the invention are also included in this application. In all of these embodiments, there is a sequence of graphics presentations and there is a specific event. In some of these embodiments, the specific event is related to the sequence of graphics presentations and in other embodiments there is no such relationship. In some of these embodiments, the specific event is displayed on the video display screen in alphanumeric form and in other embodiments the specific event is displayed on the video display screen in graphics form.

BRIEF DESCRIPTION OF THE DRAWINGS

In the drawings:

FIG. 3 is a schematic perspective view of the first embodiment in elevation of a visual display screen for use with the system shown in FIG. 2 and of a member (e.g. a pole) for holding the visual display screen for viewing by the customer;

FIG. 4 is a schematic perspective view, at a position in a market other than the checkout counter, of a visual display screen used in a second embodiment of this invention and employing an integrated bar code scanner for visually providing to a customer on an alphanumeric basis the description and prices of products of interest to the customer when the bar code scanner is activated by the customer. When the scanner is no longer activated, the display screen reverts back to graphics (pictorial) information showing advertisements and special promotions in the market;

FIGS. 12A–B, 13A–B, 14A–B, 15A–B, 16A–B and 17A–D schematically illustrate a number of additional embodiments of the invention, each of these FIGS. schematically illustrating an individual one of the additional embodiments.

DETAILED DESCRIPTION OF THE INVENTION

Figure 1:
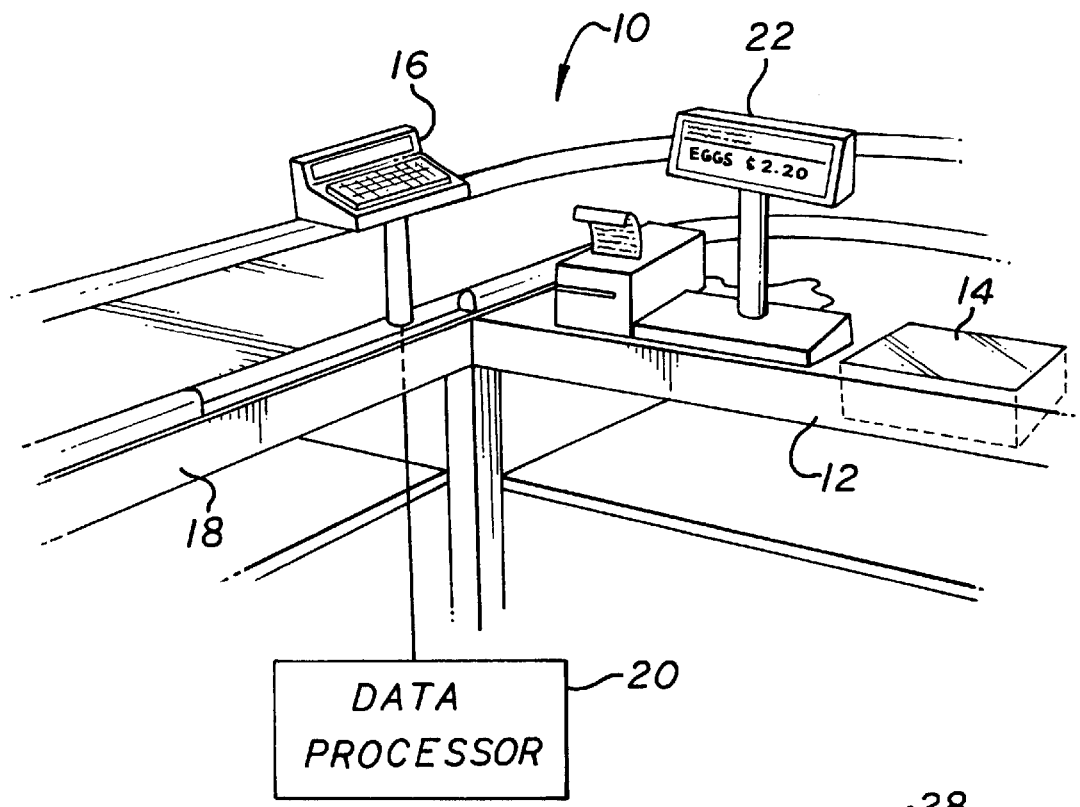
FIG. 1 is a schematic perspective view at a checkout counter in a market of a system of the prior art for visually indicating to a customer on an alphanumeric basis the products being purchased by the customer and the prices being charged by the market for such products.

FIG. 1 shows a system, generally indicated at 10, which is employed at a checkout counter 12 in various types of retail stores to record items or products being purchased by a customer, the prices being charged by the store for such items and products, and the accumulated total owed by the customer for the purchase of such items and products. The system 10 includes a bar code scanner 14 which is disposed at the checkout counter 12 to scan a bar code provided on the packagings of the items and products to identify the items and products being scanned.

The system 10 also includes a keyboard 16 which is disposed on a counter 18 adjacent the market clerk in the retail store to provide a typewritten record of items which are not prepackaged. The keyboard 16 may include a data processor internal to the keyboard. Examples of such items are fruits and vegetables which are purchased in variable quantities and which have to be weighed and which have to have a price per unit (e.g. price per pound) recorded by the clerk into the keyboard 16.

The system 10 additionally includes a computer or data processor 20 which may be located in the store to process information from a number of different systems 10 located at different positions (e.g. checkout stands) throughout the market. The computer or data processor 20 processes information supplied to it from the keyboard 16. This information may be provided to the data processor in the keyboard 16 from the operation of the keys in the keyboard by the market clerk or by the operation of the bar code scanner 14 when the clerk presents a prepackaged item or product to the bar code scanner.

The processed information is alphanumeric and consists of letters and numerals identifying the item or product being processed and the price of such item or product. The processed information from the computer 20 may be in an ASCII format which is well known in the art. The processed alphanumeric information is introduced to a visual display screen 22 which provides a visual display to the customer of such product and the price of the product. The visual display screen 22 is generally disposed on the counter of the market clerk so that it can be seen by both the market clerk and the customer. However, as shown in FIG. 1, the visual display screen may be disposed on the checkout counter 12. The visual display screen 22 is not constructed to provide graphics (pictorial) displays. The visual display screen 22 may constitute a liquid crystal display (LCD) screen which is well known in the prior art.

Figure 2:
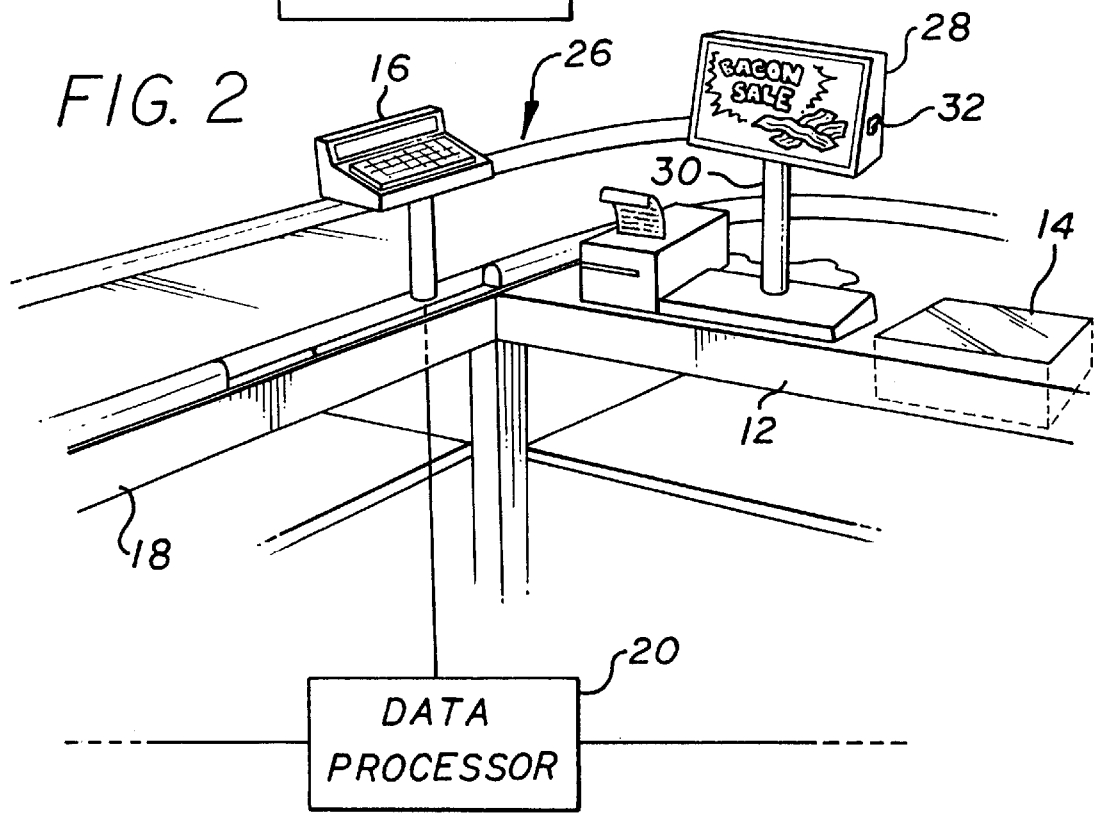
FIG. 2 is a schematic perspective view at a checkout counter in a market of a system constituting a first embodiment of this invention prior to any transaction for purchased products. When no transactions are processed, the display screen exhibits graphical information showing advertisements and special promotions in the store. The screen converts to alphanumeric information similar to that shown in FIG. 1 when transactions are initiated by products being purchased by the customer. After the transactions are completed, the display screen reverts to graphics (pictorial) information showing advertisements and special promotions in the market.

FIG. 2 schematically illustrates a system generally indicated at 26 and constituting a first embodiment of the invention. The system 26 is adapted to be disposed at the checkout counter 12 in a market. It includes the bar code scanner 14, the keyboard 16, the clerk's counter 18 and the computer or processor 20 common to the checkout counters in the market. It also includes a visual display screen 28 (preferably a liquid crystal display) which is capable of displaying alphanumeric information and graphics information. Different types of visual displays are considered to be within the scope of the invention. These include active and passive matrix liquid crystal displays (LCD's), plasma modules, cathode ray tubes (CRT's) and organic liquid crystal displays (LCD's).

The visual display screen 28 may be mounted on a member (e.g. a pole 30 in FIGS. 2 and 3) which extends, preferably vertically, above the checkout counter 12 to provide to the customer and the clerk with an easy viewing of the image on the visual display screen. The system 26 additionally includes a switch 32 which is normally biased to provide the graphics (pictorial) information and which is activated by the store clerk at the cash register to provide the alphanumeric information. This is initiated when the clerk starts to process the products or items being purchased by the customer. Although the switch is shown as being mechanical in FIG. 2, it is preferably electronic in design. Suitable switches are well known in the prior art. The time period during which the switch resides in the transaction (alphanumeric) mode or in the advertising/promotion (graphic) mode is controlled by software internal to the system.

When the switch 32 is in the state for providing the alphanumeric information, the visual display 28 specifies on an alphanumeric basis the item or product being processed at each instant by the market clerk and the price of such product. The operation of the visual display 28 in the alphanumeric mode appears similar to the operation of the visual display 22 in the prior art embodiment shown in FIG. 1, except in this case the text on the visual display screen 28 is displayed using the hardware graphics mode rather than the hardware text mode used in FIG. 1.

In the advertising mode, the visual display 28 may illustrate (preferably in color) individual items or products sold in the store. These items or products may illustratively represent specials which are being offered at reduced prices or they may represent new items or products which have not been previously offered.

The graphics images can be in a variety of formats such as scrolling static images, antimated imagery, full video, etc. In the graphics mode, a sequence of graphics presentations is displayed on the visual display screen 28. For example, a sequence of pictorial images may be displayed on the visual display screen 28. The sequence of the pictorial images may be controlled by the computer or processor 20. When the store clerk starts to process items or products disposed at the checkout counter 12 for purchase by the customer, the computer 20 activates the switch 32 which causes the visual display 28 to change to the alphanumeric mode. This causes an alphanumeric display to be provided on the visual display 28. The item or product may be processed by the clerk by presenting the item or product to the bar code scanner 14 or by entering the item or product into the keyboard 16. The items being purchased by the customer and being processed in alphanumeric form at the character counter 12 may be considered to constitute one form of a specific event.

The graphics sequence of pictorial images may be accessed from a centralized system such as from a network server which may be considered as a part of a local area network. Alternatively, the graphics sequence of pictorial images may be accessed from a decentralized system. The access may be locally through embedded and/or add-on types. For example, the graphics sequence of pictorial images may be obtained from removable/rewritable mass storage devices such as disk/flash memory cards. As another alternative, the graphics sequence of pictorial images may be accessed from a combination of a centralized system and a decentralized system. All of these different alternatives are considered to be within the scope of the invention.

The alphanumeric display then continues for a particular period of time. For example, the alphanumeric display may continue for the period of time that the articles being purchased by the customer are processed by the clerk and that the purchases are summed by the processor 20 to obtain a total amount of money owed by the customer. The display provided by the visual display screen 28 is then returned by the computer 20 to the graphics (pictorial) mode after a preselected period of time (e.g 30 seconds), to display the sequence of graphics presentations. It should be noted that the display screen can be programmed under some circumstances to display both graphical pictorial images and alphanumeric information simultaneously in a superimposed format or to display the graphical pictorial images and the alphanumeric information in different areas of the screen.

As will be seen, the system shown in FIGS. 2 and 3 provides certain advantages over the prior art. It provides alphanumeric point-of-sale information on a visual display screen of (a) the items being purchased at a checkout counter in a store by a customer, (b) the price of each such item and (c) the total cost of all of the items being purchased. The system adds the features of providing a sequence of graphics presentations on the visual display screen relating to advertisements and promotions being offered by the store. It provides for the display of this sequence of graphics presentations on the display screen during the time that the alphanumeric information of items and item prices is not being displayed on the visual display screen. It provides these added features to the market's existing character-based point-of-sale system without requiring any software or hardware changes to be made by the market in the system. Furthermore, only a single visual display screen has to be used to provide the graphics and alphanumeric displays. Another important advantage is that the embodiment is compatible with previously installed point-of-sale (POS) systems and existing managed information systems (MIS).

FIG. 4 schematically illustrates a visual display screen 38 which may be included in a second embodiment of the invention. This second embodiment is generally indicated at 36 in FIG. 7. Different units of the system 36 are adapted to be located in the market at strategic positions different from the positions of the checkout counters 12 although they can also be located at the checkout counter. For example, in a grocery store a first unit of the system 36 may be disposed at a strategic position in the produce section; a second unit of the system 36 may be disposed at a strategic position in the bread and pastry section; and a third unit of the system 36 may be disposed at a strategic position in the meat section. Preferably the different units of the system 36 are disposed at strategic positions in the market where heavy traffic occurs.

The system 36 includes a visual display screen 38 (FIGS. 4–5) corresponding to the visual display screen 28 in FIG. 3. The visual display screen 38 is disposed in a housing 40. The visual display screen 28 may include an embedded processor. A bar code scanner 42 corresponding to the bar code scanner 14 in FIG. 3 is disposed in an opening 44 at the bottom of the housing 40 to scan bar codes on items and products. The bar code on the item is placed on the window of the scanner 42 as shown schematically in FIG. 5. The housing 40 is disposed on a member 46 extending, preferably vertically, from a support shelf 48, in the store. A switch 50 corresponding to the switch 32 is represented pictorially as a mechanical switch in FIGS. 4 and 5, but is preferably electronic in nature and is provided for controlling the introduction to the visual display screen 38 of the sequence of graphics presentations or the specific event. Advertisements of products in the store or other matters of interest to the community are presented to the visual display screen 38 under the control of the computer or data processor 20 (FIG. 2) servicing the entire store. These advertisements may constitute a sequence of the graphics presentations.

A customer in the store may desire to determine an identification of a particular product and other information about the product including the price of the product. The customer places the bar code on the product in the window of the bar code scanner 42 which reads the bar code and passes this information to the computer or processor 20. The computer or data processor 20 identifies the product, and the price of the product, from this bar code and passes this information to the visual display screen 38 for display in alphanumeric form on the display screen. This information may constitute a specific event.

The priority in the display on the visual display screen 28 of the information relating to the specific event (e.g. the information concerning the specific product) continues for a particular period of time (e.g. 30 seconds) after the alphanumeric information relating to the particular product scanned by the bar code scanner 42 is displayed on the display screen. If the customer scans another bar code using the bar code scanner 42 in this particular period of time, the priority in the operation of the visual display screen 38 in the alphanumeric mode will continue again for the particular period of time (e.g. 30 seconds). If the customer does not scan another item or product in the particular period of time, the visual display screen 42 will revert to the graphics mode and will again display the sequence of graphics images on the visual display on a priority basis in accordance with the operation of the computer or data processor 20. As in the first embodiment of this system, the graphical images in the second embodiment can be in the form of scrolled static images, animated images, full video, etc.

Figure 5:
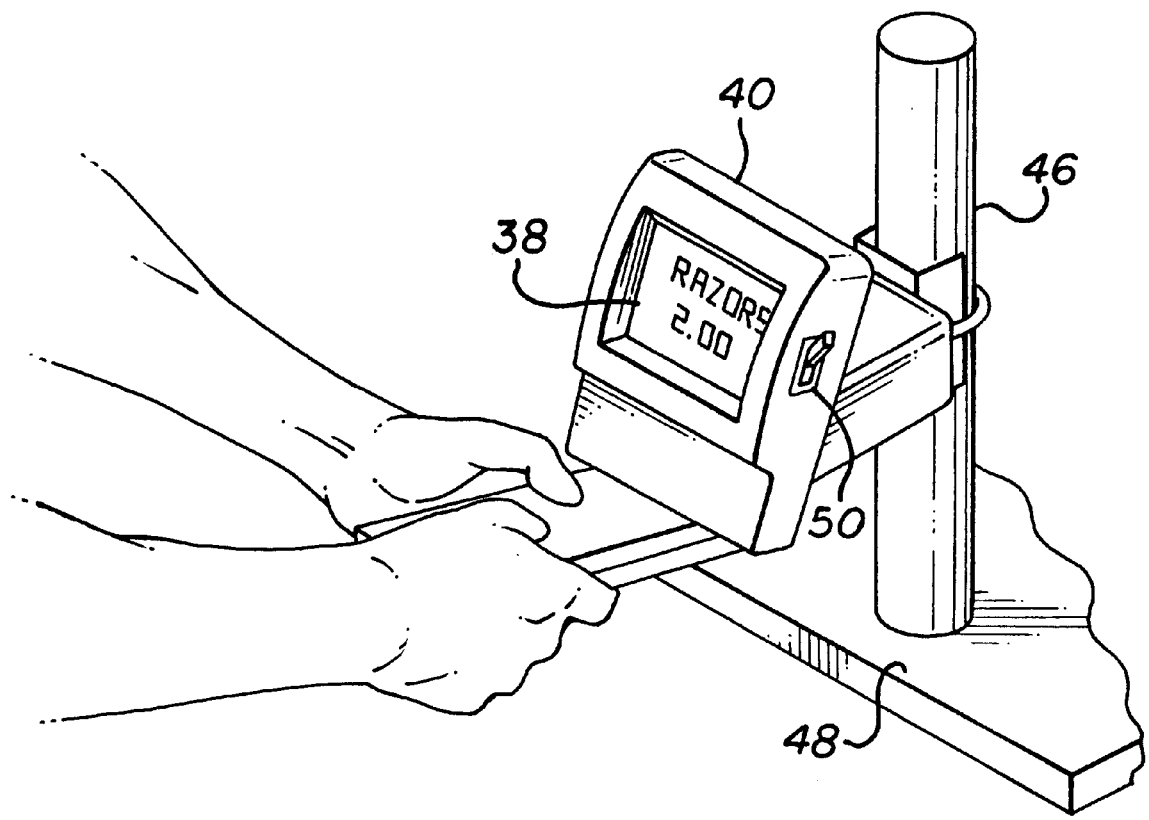
FIG. 5 is a schematic perspective view in elevation of the visual display screen shown in FIG. 4 and illustrates the use by a customer of the visual display screen to obtain an indication of a product, and the price of the product, being considered by the customer for purchase.

The system shown in FIGS. 4 and 5 and described above offers certain advantages over the prior art similar to the advantages discussed above in connection with the embodiment shown in FIGS. 2 and 3. It provides the visual display screen 28 for alphanumerically identifying a specific item of merchandise in a market and the price of such item. It provides for a sequence of graphics presentations to be displayed on the visual display screen during the time that the alphanumeric information is not displayed on the display screen. It provides the displays on a single visual display screen. Furthermore, the system shown in FIGS. 4 and 5 is compatible with previously installed point-of-sale (POS) systems and existing managed information systems (MIS).

Figure 6:
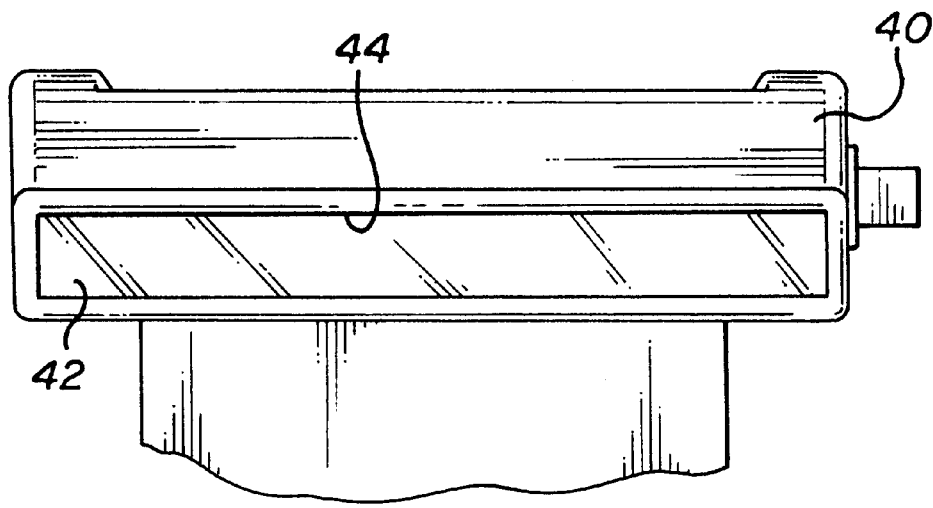
FIG. 6 is a bottom plan view of the visual display screen shown in FIG. 5 and to shows a bar code scanner for scanning products to determine the identification of the product and the price of the product.
Figure 7:
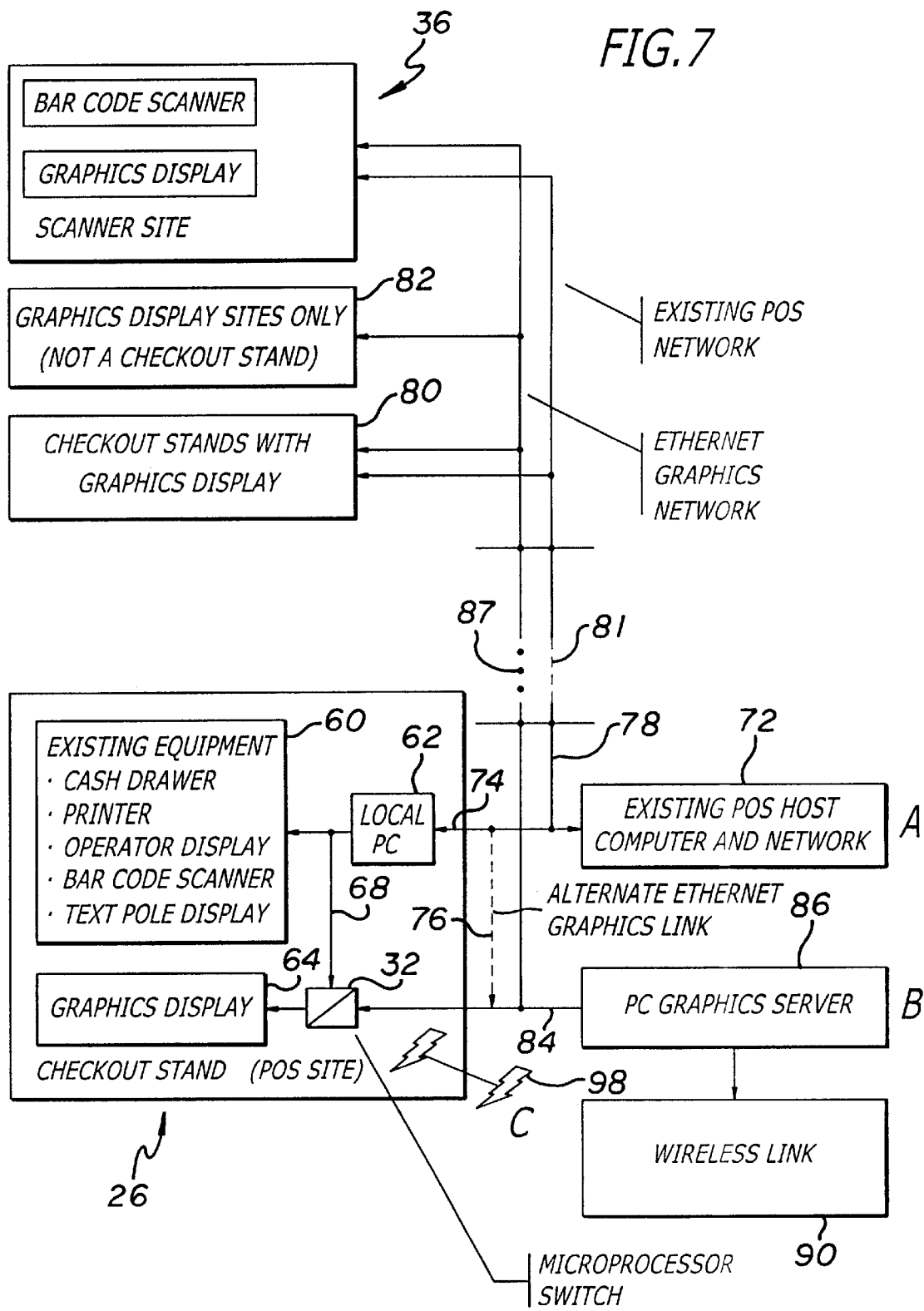
FIG. 7 is a block diagram of a system which shows the main elements of the system, and the interfaces between these main elements, for the embodiment shown in FIGS. 2–3 and the embodiment show in FIGS. 4–6.

FIG. 7 is a composite view, primarily in block form, schematically showing the prior art system of FIG. 1, the embodiment shown in FIGS. 2 and 3 for use at the checkout counter in conjunction with an existing point of sale (POS) system already installed in the store, and the embodiment shown in FIGS. 4–6 for use at strategic positions throughout the store other than only at the checkout counter. FIG. 7 accordingly indicates that a composite system in a market can include systems of the prior art and systems of this invention. The composite system can be used with various local area network protocols and is not limited for use only with an Ethernet Network.

The system 26 of FIG. 2 includes a block 60 in FIG. 7. The block 60 represents the prior art system 10 of FIG. 1 at the checkout counter 12. Within the block 60 is a cash drawer for holding money, a printer for printing on a document the various items or products being purchased by a customer and the prices of such items or products, a visual display screen (designated in FIG. 7 as "Operator Display") at the clerk's counter, a bar code scanner and a visual display screen mounted on a support member (e.g. a pole) at the checkout counter 12 and designated in FIG. 7 as "text pole display". The system of the prior art also includes a local processor 62 disposed at the clerk's counter.

A rectangle 64 is also included within the system 26 in FIG. 7. The rectangle 64 constitutes one of the inventive features in the system 26. It includes the visual display screen 28 and the features for providing both graphics and alphanumeric information on the visual display screen. It is designated as "Graphics Display" in FIG. 7. The switch 32 is also shown within the system 26 to indicate that it constitutes one of the features distinguishing the system 26 over the prior art. A connection 68 is shown as being made from the local processor 62 to the switch 32 to control the operation of the switch in either the graphics mode to display the sequence of graphics presentations or the alphanumeric mode to display the specific event.

An existing point-of-sale (POS) host computer and network 72 is included within the prior art. The computer 72 may be considered to constitute the equivalent of the processor 20 and may be disposed at a strategic location in the store to process the signal information provided by the electronic equipment in the market. A line 74 extends from the host computer 72 to the local processor 62. The line 74 has arrows in opposite directions to indicate that information flows from the processor 62 to the host computer 72 and from the host computer to the processor.

A broken line 76 extends from the host computer 74 to the switch 32. The line 76 is one of the novel features of the invention. The line 76 is broken to indicate that the host computer 72 may service a number of systems each corresponding to the system 26 in FIG. 7.

A line 78 extends from the host computer 72 to checkout stands 80 with graphic displays, to graphics display sites 82 providing only graphics displays (and not alphanumeric displays) and to systems 36 such as shown in FIGS. 4–6. The line 78 is broken as at 81 to indicate that the line extends to a number of the checkout stands 80, a number of the graphics display sites 82 and a number of the systems 36 also shown in FIGS. 4–6.

The checkout stands 80 may be considered to correspond to additional ones of the system 26. The graphics display sites 82 may be considered to be located at sites other than checkout stands. The sites 82 provide graphics displays corresponding to the graphics displays at the system 26 and the stands 80 but do not provide a display of alphanumeric information of specific events such as are provided at the system 26, the checkout stands 80 and the system 36.

A line 84 is also shown as extending to the switch 32 from a Network server 86 which is designated in FIG. 7 as a "PC Graphics Server". The line 84 is one of the features of this invention. The line 84 also extends to a broken line 87 which indicates that the line may extend to a number of systems corresponding to the system 26 (e.g. the systems 80), to the sites 82 and to the system 36 shown in FIGS. 4–6. A wireless link 90 is shown as communicating with the switch 32 on a wireless basis.

The system shown in FIG. 7 and described above shows three different ways or modes of including a graphics server in the system. These are respectively designated as A, B and C. The A mode of operation is provided when the host computer 72 includes a graphics server such as shown at 86 in FIG. 7. Under such circumstances, the graphics server does not have to be included as a separate unit in the system. This would be typical of systems that already have graphics display capabilities and an existing network. The B mode of operation occurs when the graphics server 86 is included as a separate item in the system. Under such circumstances, a plurality of wires (indicated at 84, 76 and 87) are provided in the system. If it is desired to avoid the plurality of wires 84, 76 and 87, the wireless link 90 is provided to communicate with the switch 32. This is indicated by lightning bolts 98 in FIG. 7. The wireless link 90 provides the C mode of operation.

FIGS. 8–11 constitute flow charts which show successive steps in the operation of the systems including the operation of the system 26 in FIGS. 2, 3 and 7 and the system 36 in FIGS. 4–6 and 7. In the flow chart shown in FIG. 8, a block 100 indicates that, as a first step, a server is addressed in an attempt to access information from the server. The server is interrogated after the power is turned on as indicated at 102 in FIG. 8.

After the server is addressed as at 100, an attempt is made as at 104 to connect to the server. If the server is reached as at 106, a determination is made as at 108 as to whether there is a new initialization file (or sequence of graphics images) that has to be loaded from the server into the processor at the visual display screen. If the answer is yes, a new file is loaded from the server into the processor at the graphics display screen. This is indicated at 110 in FIG. 8. This new file is then provided in the processor at the visual display screen as indicated at 112 in FIG. 8. In various blocks in FIG. 7, the word "Initialization" is shortened to -Ini-.

Figure 8:
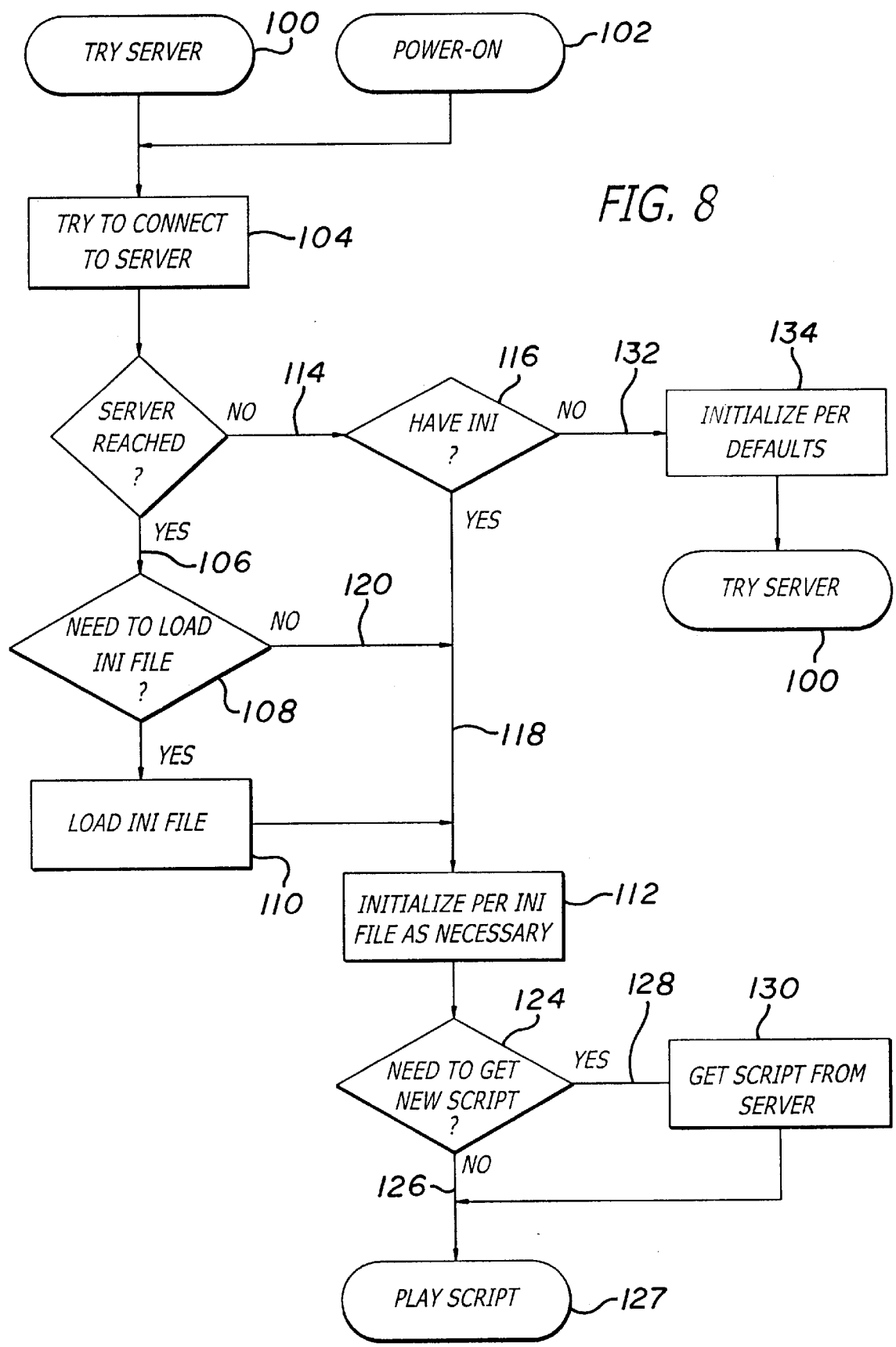
FIGS. 8–11 are flow charts showing sequences of operations in the systems shown in FIGS. 2–7 for providing the graphics and alphanumeric displays on the video display screen.

If the server is not reached, this is indicated at 114 in FIG. 8. When this occurs, a determination is made as at 116 if there is an initializing file in the processor at the visual display screen. If there is such an initializing file in the processor at the visual display screen, it would have been previously transferred to the processor at the visual display screen from the server. If there is an initializing file in the processor at the visual display screen as indicated at 118 in FIG. 8, it is used as the initial file to set up a visual display. This is indicated at 112 in FIG. 8. The initializing file from the processor in the visual display is also used as the first file when an indication is provided as at 120 that there is no need to load an initializing file into the processor at the visual display from the server.

After the visual display has been initialized as necessary, a determination is made as to the need to obtain a new script from the server. This is indicated at 124 in FIG. 8. If the answer is no (see 126 in FIG. 8), the initializing script in the processor at the visual display is played to provide the graphics displays on the visual display screen. This is indicated at 127 in FIG. 8. If a determination 128 is made that there is a need to obtain a new script from the server, a new script is obtained from the server as indicated at 130 in FIG. 8. This new script is then played at the visual display screen (see 127 in FIG. 8).

A determination may be made as at 132 that there is no initializing file in the processor at the visual display. When this occurs, a preset initializing file may be used for the visual display. This is indicated at 134 in FIG. 8. The server is then tried as indicated at 100. The steps discussed above are then repeated.

Figure 9:
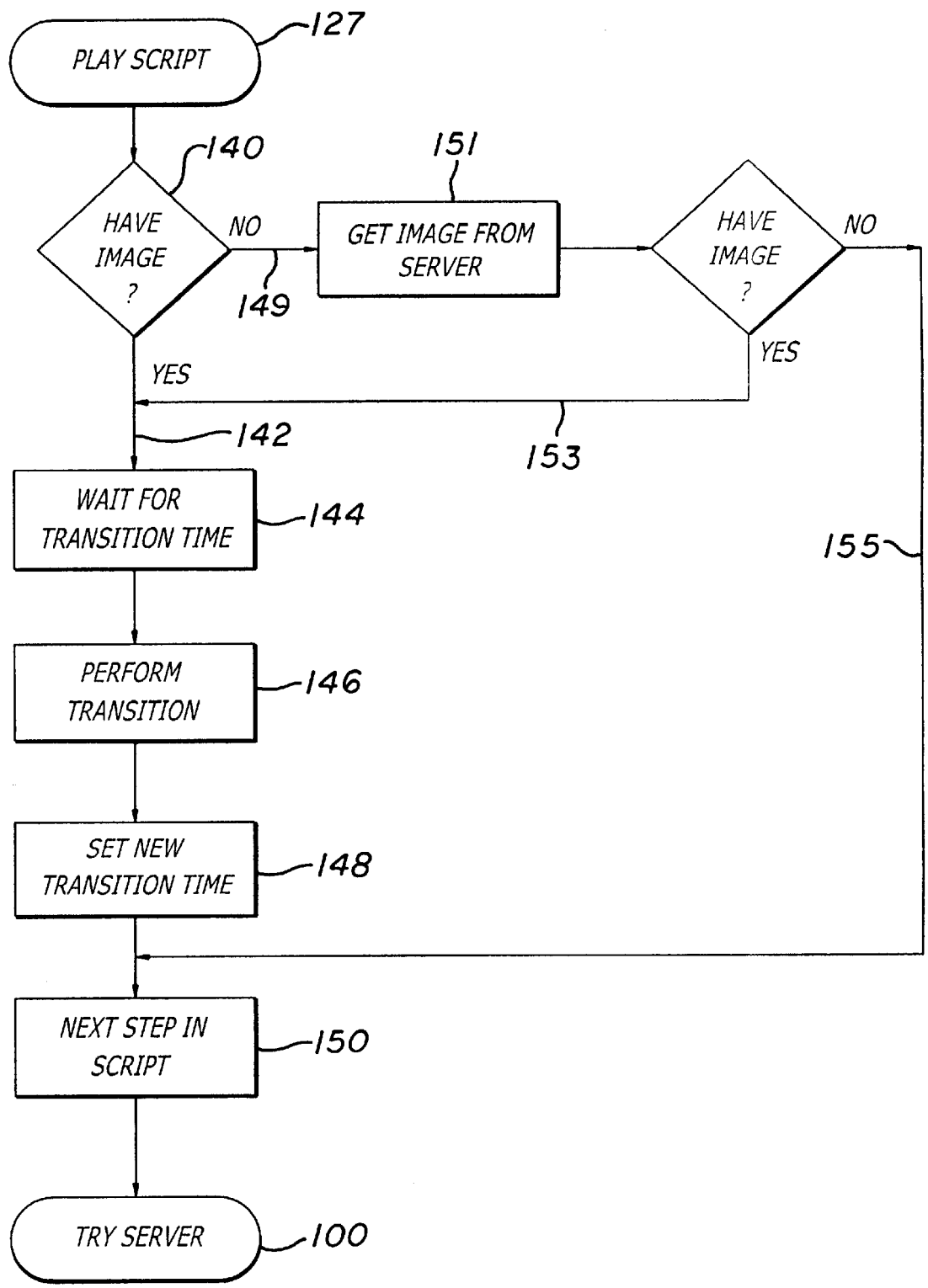

The step 127 indicated as "Play Script" in FIG. 8 is also repeated at the top of FIG. 9. When the script in the processor at the visual display image is played, a determination is made as to whether the playing has progressed so far that a graphic image may not be available in the sequence to be displayed on the visual display screen. This determination is indicated at 140 in FIG. 9. If a graphics image is still available to be displayed at the visual display screen in the sequence, an indication to this effect is provided as at 142 in FIG. 9.

There is a transition time between the display of each graphics image on the visual display and the display of the next graphics image on the visual display. This transition time depends upon the type of transition between each image in the sequence and the next image in the sequence. For example, a gradual fade away from one (1) image to the next image may take longer than an instantaneous change from one image to the next. The transition time is determined at 144 in FIG. 9 and the transition is provided at 146 in FIG. 9 in accordance with the determination in the transit time.

A new transition is then provided for the next image in the sequence. As with the previous image, this transition time depends upon the type of transition between the previous image and this next image in the sequence. This is indicated at 148 in FIG. 9. The next step in the script downloaded from the server is then performed as indicated at 150 in FIG. 9. The sequence is then returned to the try server block 100 in FIG. 8.

The determination as at 140 in FIG. 9 may indicate that there is not another graphics image available in the sequence. This is indicated at 149 in FIG. 9. An attempt is then made as at 151 to get an image from the server. If an image is obtained from the server as indicated at 153, a wait is provided as at 144 for the transition time of the image. If an image is not provided from the server as indicated at 155, the next step 150 in the script downloaded from the server is performed.

Figure 10:
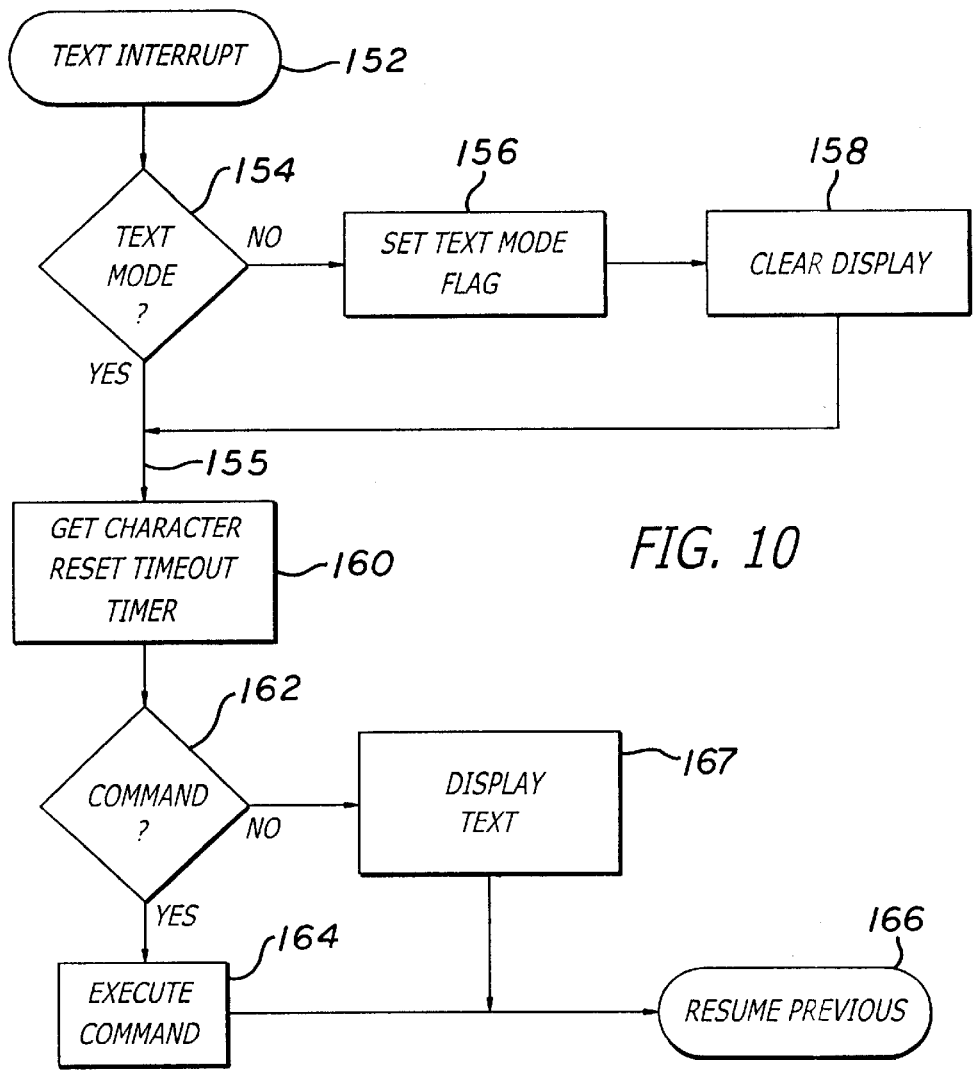

FIG. 10 is a flow chart schematically showing the transitions between the alphanumeric display and the graphics display on the visual display screen. The flow chart shown in FIG. 10 is particularly adapted to be used with the embodiment shown in FIGS. 4–6 and indicated at 36 in FIG. 7. In FIG. 10, the alphanumeric mode is designated as "text mode". In FIG. 10, the visual display screen is initially shown, as at 152, as operating to provide a "text" (or alphanumeric) display on the display screen by interrupting the graphics display on the visual display screen. A determination is then made (see 154) as to whether it is in the text mode. If the answer is "no", a text mode flag is set as at 156 and the display is cleared of graphics indications (see 158).

If the determination is made as at 155 that the visual display screen is in the text mode, the next alphanumeric indication is provided in the visual display screen and the time out timer controlling the return to graphics indications on the visual display screen after the predetermined period (e.g. 30 seconds) is returned to a zero time. This is indicated at 160 in FIG. 10. A determination is then made as at 162 as to whether there is a command. If the answer is yes, the command is executed (see 164) and the previous operation of providing graphics displays is resumed as at 166. If there is no command, the alphanumeric indication provided at 160 is displayed (see 167) and the previous operation is resumed as at 166.

Figure 11:
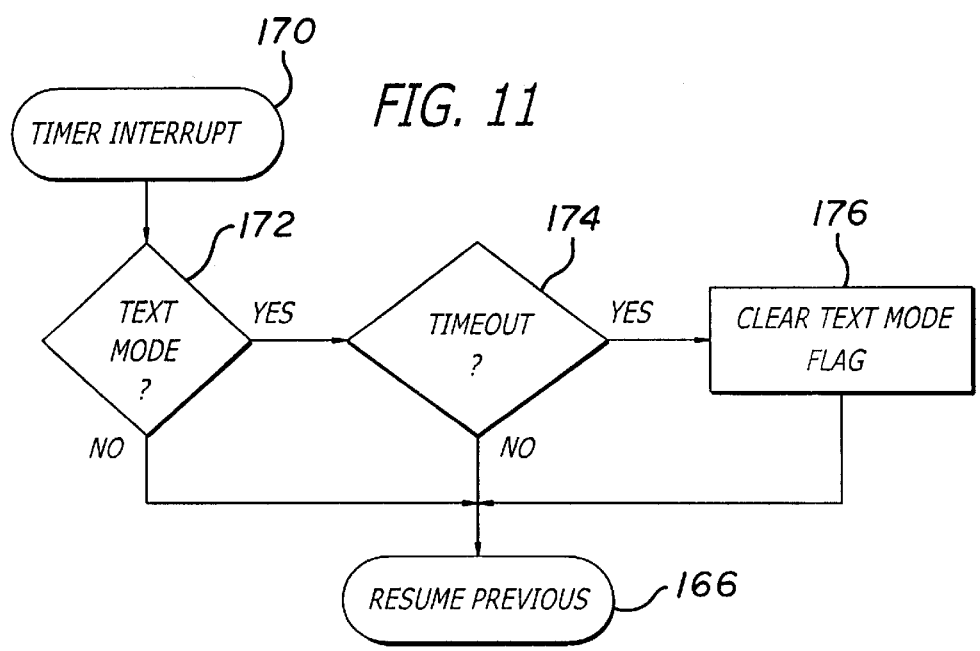

FIG. 11 is a flow chart which determines at each instant whether the timeout period (e.g. 30 seconds) has been reached in the embodiment shown in FIGS. 4–6 and indicated at 36 in FIG. 7 when alphanumeric information is being displayed on the visual display screen. As indicated at 170 in FIG. 11, a timer interrupt is provided to determine whether a conversion should be provided between an alphanumeric display and a graphics display on the visual display screen.

As a first step, a determination is made as at 172 as to whether the visual display screen is operating in the text mode to display alphanumeric information. If the answer is no, the previous operation (indicated at 166 in FIG. 10) of displaying graphics information is resumed. If the answer is yes, a determination is made every second as to whether the timeout period (e.g. 30 seconds) has been reached. If there is no timeout, the previous operation (see 166) of displaying graphics information is resumed. If the answer is yes, the text mode flag is cleared (see 176) and the previous operation 166 is resumed.

In the embodiments described above, a bar code scanner is provided to scan a product and provide alphanumeric information relating to the scanned product. Furthermore, the product sensed by the bar code scanner and providing the alphanumeric information and the products providing the graphics information are related in the sense that they can be purchased in a market.

Figure 12A:
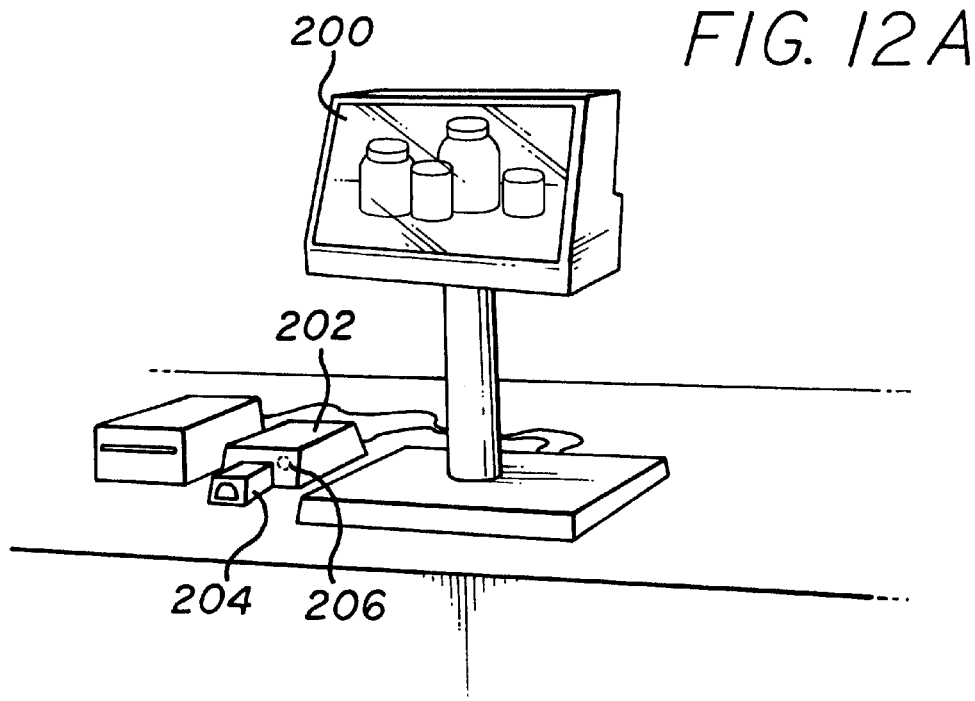
Figure 12B:
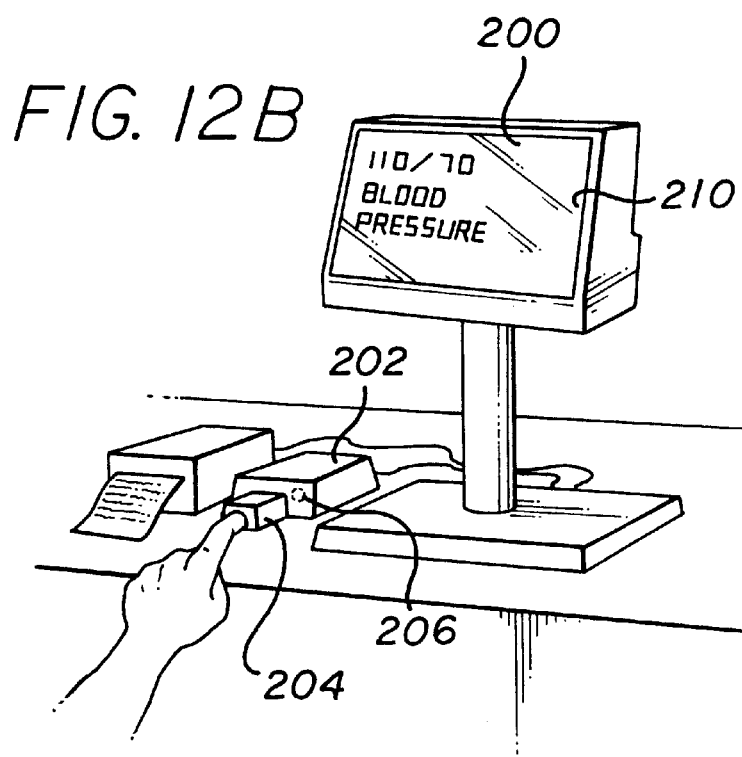

The invention actually has a broader scope than can perhaps be appreciated from the embodiments described above. For example, in a pharmacy or drug store as shown in Figure 12A, a graphics screen 200 may be used to promote a sequence of pharmaceuticals which can be purchased on an over-the-counter basis without any prescription. The graphics screen 200 may be interfaced with a blood pressure sensor 202. When a customer inserts his or her finger into a sensor port 204 in the sensor 202 as shown in FIG. 12B, an electronic switch 206 is activated. This causes the display 200 to convert to alphanumeric data and to provide an alphanumeric indication of the customer's pulse and/or blood pressure parameters. A second electronic switch could be simultaneously activated to energize a printer which produces a hard copy of the alphanumeric information for the customer. When the alphanumeric data has been shown in the display 210, the display again shows the sequence of pharmaceuticals. As will be appreciated, to the graphics display relating to the pharmaceuticals may not necessarily be considered as being related to the alphanumeric display relating to an individual's blood pressure.

As another example, in a natural food store or health center as shown in FIG. 13A, a graphics display 210 may promote diet plans and/or vitamins in a sequence of graphics presentations. In this embodiment, a scale 212 may be provided. When the customer steps on the scale 212 as shown in FIG. 12B, the display 210 provides alphanumeric information of the customer's weight. The display may also provide other alphanumeric information unrelated to the customer's weight. For example, the display 210 may provide alphanumeric information such as the customer's horoscope. When the alphanumeric information has been displayed, the display returns to the sequence of graphics presentations.

Another embodiment may be provided in an industrial facility or an office complex. A display 220 in FIG. 14A may be installed on a food dispensing machine or a sandwich dispensing machine to provide graphics displays of the food being dispensed by the machine. These graphics displays may be provided to promote food purchases or to provide specific graphical information relating to the company employing the individuals at the industrial facility or the office complex. When the customer touches the screen of the display 220 (as shown in FIG. 14B) at the time that the display is graphically showing a food item, an electronic switch 222 in the display 220 is activated to provide an alphanumeric description of the food item and an alphanumeric indication of the price of the food item. Afterwards, the to display 220 again shows the graphics sequence of food presentations.

Figure 15A:
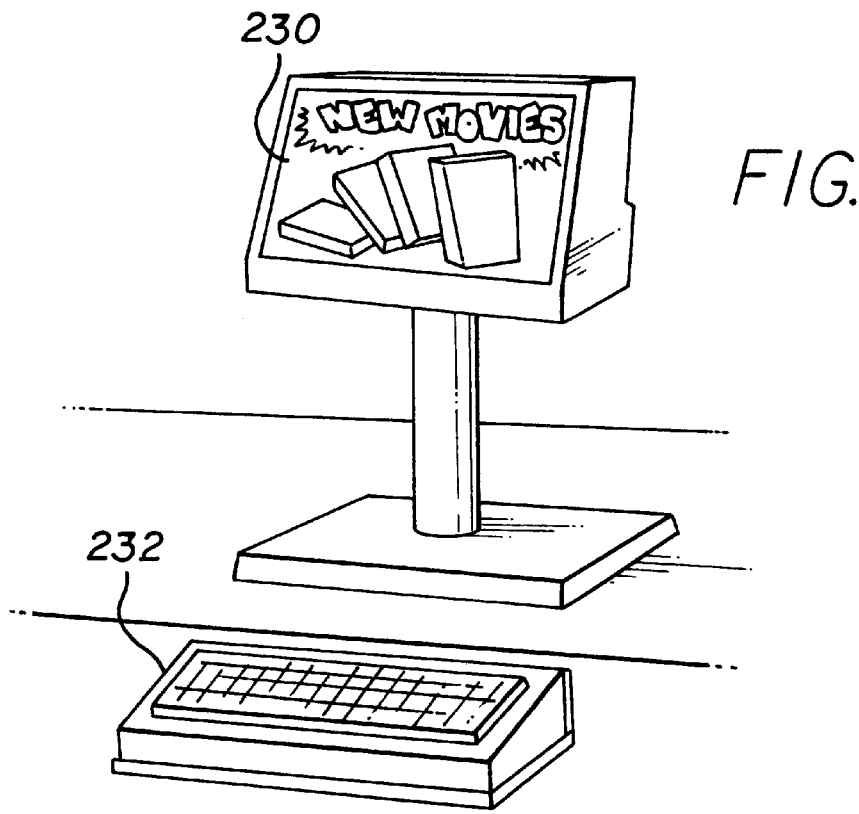
Figure 15B:
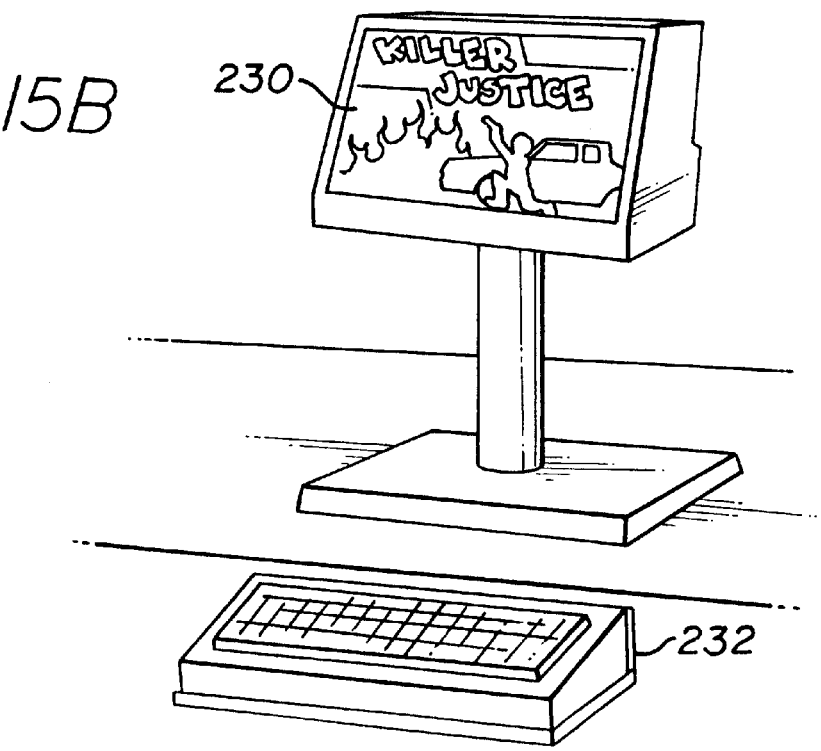

FIGS. 15A and 15B show another embodiment of the invention. The embodiment is provided in a video rental store in which a display 230 graphically promotes a sequence of newly received video movies as shown in FIG. 15A. This sequence may be considered to constitute a sequence of graphics presentations. A customer types the name of a movie in a keypad 232 as shown in FIG. 15B. This causes an electronic switch to be activated such that the system searches for and locates the trailer for the selected movie. The trailer may be in graphics or alphanumeric form but is preferably in graphics form to display fragments of the movie. The trailer may be considered to constitute a specific event. When the trailer has been shown in the display 230, the system causes the graphics promoting the newly released 20 films to be shown in the display 230. In this way, both the sequence of graphics presentations and the specific event may be considered to be displayed in graphics form. The sequence of graphics presentations and the specific event may be considered to be related since both relate to movies.

Figure 16A:
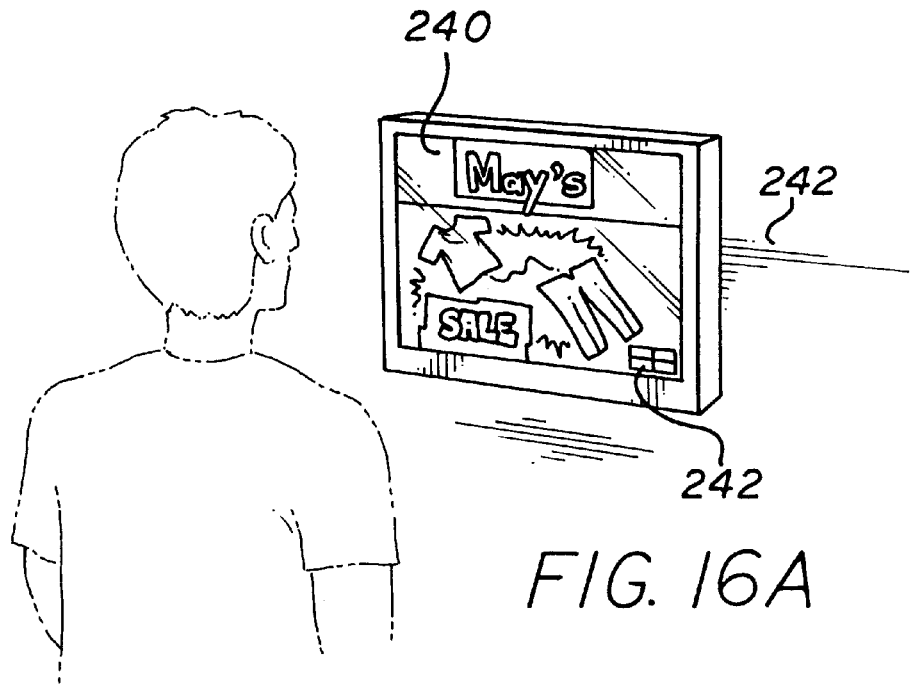
Figure 16B:
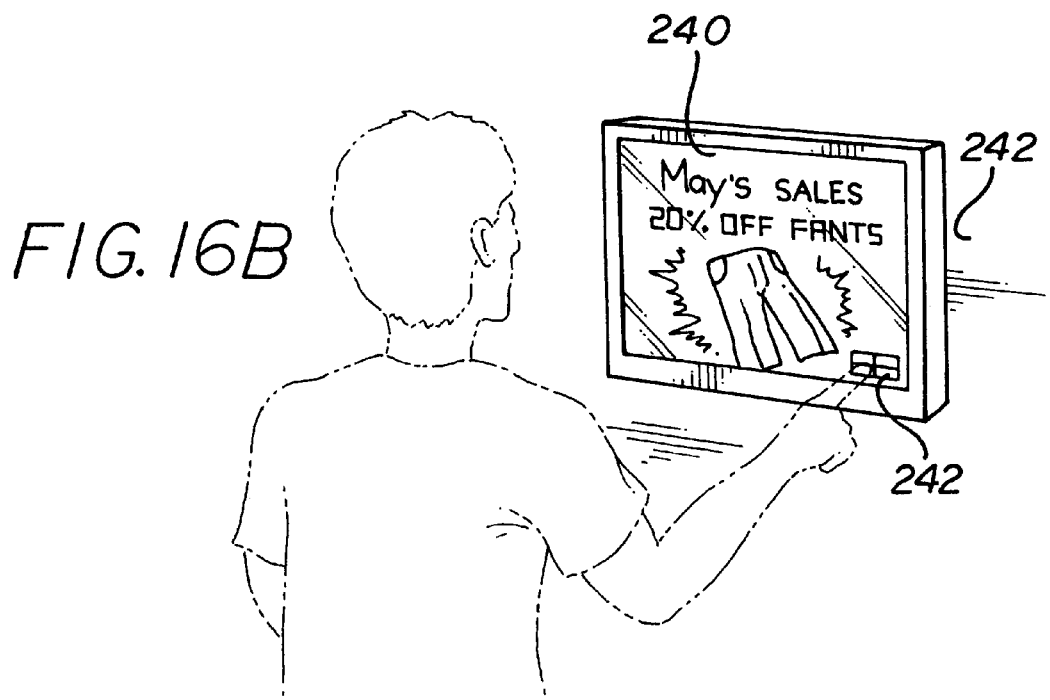

FIGS. 16A and 16B show a graphics display 240 mounted in a Kiosk 242 (FIG. 16A) in a shopping mall. The graphics may constitute a sequence of visual presentations or promotions of various specialty stores in the mall. The display 240 may include a touch screen 242 which, when pressed as shown in FIG. 16B, allows a customer to highlight a particular store in the mall. The highlighted information may include graphics, and/or alphanumerics, providing promotional sales information concerning the store. After the information specific to the selected store has been shown in the store, the display 240 may again show the sequence of visual presentations of various specialty stores in the mall. Thus, the sequence of graphics presentations and the specific item may be considered as related and both may be displayed in graphics form or the specific item may be displayed in alphanumeric form.

Figure 17A:
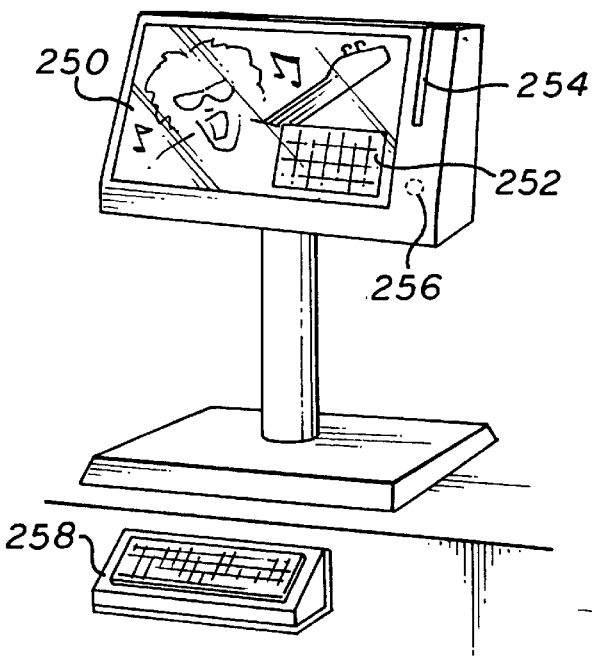
Figure 17B:
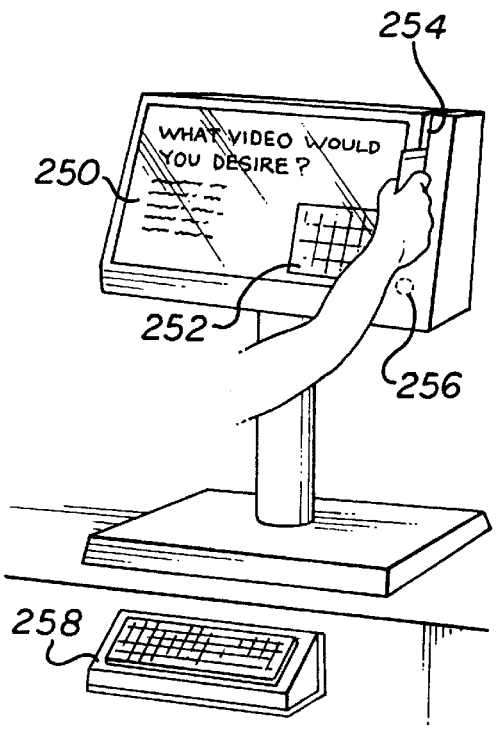
Figure 17C:
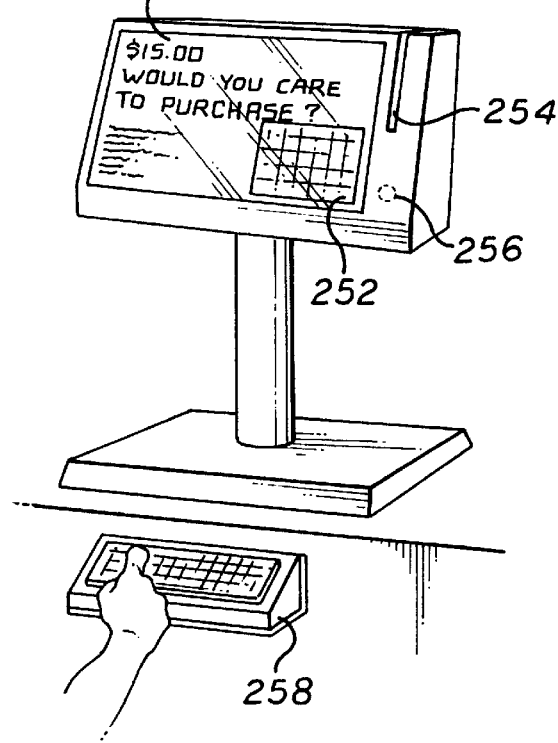
Figure 17D:
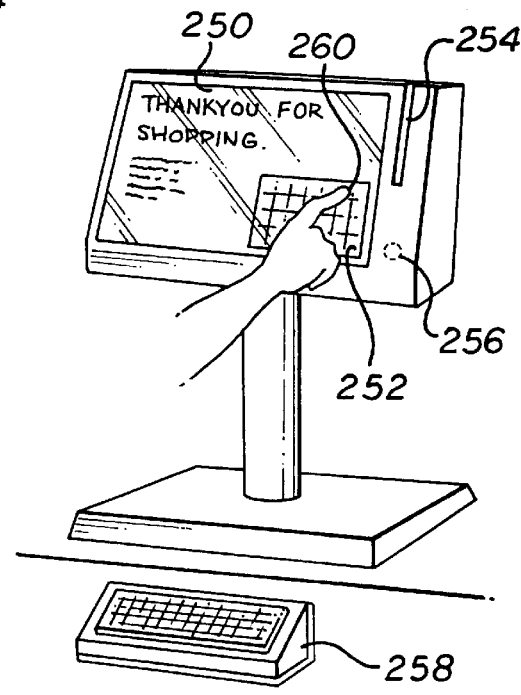

In a music store where a graphics display 250 in FIGS. 17A–17D is highlighting new music videos, the display is interfaced with a touch screen 252 and a credit card reader 254. When the customer inserts his or her credit card in the reader 254 as shown in FIG. 17B, an electronic switch 256 is activated which causes the display to provide alphanumeric information in which the customer is queried concerning a music video that he may desire to purchase. The customer inputs his selection via a keypad 258 (FIG. 17C). The display 250 then indicates the price and asks the customer if the customer wishes to purchase the selected music video. If the customer responds in the affirmative via a touch screen 260 (FIG. 17D), the customer's credit card is automatically charged an the music video and is dispensed to the customer. The display 250 then shows again highlights of the music videos in the graphics sequence.

As will be seen, all of the different embodiments have a common concept. A visual display screen provides a display of a first sequence of graphics presentations. This first sequence is interrupted upon the occurrence of a specific event which may be initiated by the viewer or by a third party. When this occurs, a presentation of the specific event is provided by the display. This presentation of the specific event may be in either graphics or alphanumeric form. The presentation of the specific event may involve one image or a second sequence of images as in the embodiment shown in FIGS. 2–3 and 7. The specific event may be related or unrelated to the first sequence of graphics presentations. When this presentation has been completed, the display resumes the first sequence of graphics presentations.

It will be appreciated that the sequence of the graphics presentations and the specific event can be provided so that each is exclusive from a time standpoint. In other words, the sequence of the graphics presentations may be provided before the specific event and may be resumed after the specific event has been displayed. Alternatively, the sequence of the graphics presentations and the specific event may be presented simultaneously in a superimposed relationship or on a split screen when both the sequence of the graphics presentations and the specific event are simultaneously provided. Such visual presentations are considered to be within the scope of this invention.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. In combination,
    a visual display screen constructed to provide graphics and alphanumeric displays,
    a first system displaced from the display screen and constructed to activate the visual display screen to provide a display of a specific item,
    a second system displaced from the display screen and constructed to activate the visual display screen to provide a sequence of graphics presentations,
    first controls for providing priority to the activation of the visual display screen by the second system relative to the activation of the screen by the first system,
    second controls operative to de-activate the priority of the second system and to activate the first system for the presentation of the specific item on the visual display screen upon the occurrence of the specific item, and
    third controls for activating the visual display screen again to display the sequence of graphics presentations after the presentation of the specific item on the visual display screen.

2. In a combination as set forth with claim 1 wherein the first system provides for the display on a sequential basis of graphics advertisements of different items and wherein the second system provides an identification of the specific item and parameters individual to the specific item.

3. In a combination as set forth in claim 1 wherein the second controls are selected from a group consisting of a bar code scanner and a keyboard and wherein a processor responsive to an operation of a selected one of the bar code scanner and the keyboard introduces to the visual display screen signals specifying the specific item and the parameters individual to the specific item.

4. In a combination as set forth in claim 1 wherein the second controls include a bar code scanner for identifying a bar code presented by the specific item to the bar code scanner and wherein a processor is responsive to the bar code from the bar code scanner for producing signals identifying the specific item and the parameters individual to the specific item and wherein the visual display screen is responsive to the signals from the processor for visually identifying the specific item and the parameters individual to the specific item.

5. In a combination as set forth in claim 4 wherein the visual display screen continues to provide the priority to the first system when the first system provides a second specific item within a particular time after the first system provides the first specific item and wherein the visual display screen provides the priority to the second system when the first system thereafter fails to provide a second specific item within the particular time after the first system provides the first specific item.

6. In a combination as set forth in claim 1 wherein the second controls include a bar code scanner for identifying the specific item's bar code presented to the bar code scanner and include a keyboard for identifying the specific item in accordance with an operation of keys on the keyboard and wherein a processor is responsive to one of the bar code from the bar code scanner and the operation of the keys on the keyboard for producing signals identifying the specific item and the parameters of the specific item and wherein the visual display screen is responsive to the signals from the processor for visually providing an identification of the specific item and the parameters of the item.

7. In a combination as set forth in claim 6 wherein
    the specific item is a product in the market and the parameters include an indication of the price of the item and the visual identification of the item and the price of the item are alphanumeric and wherein
    the sequence of graphics presentations provides a graphics sequence of advertisements and promotions of products in the market.

8. In combination,
    a support member,
    a visual display screen disposed on the support member and constructed to display alphanumeric information and graphical information,
    a member displaced from the display screen and constructed to identify a specific item and parameters concerning the specific item,
    a processor displaced from the display screen and constructed to receive the identification of the specific item and the parameters and to provide to the visual display screen the identification of the item and the parameters of the item for visual display by the display screen,
    the visual display screen also being constructed to provide a sequence of graphics presentations, and
    a priority encoder for normally providing a priority on the visual screen to the sequence of graphics presentations and responsive to the information from the processor for providing on the visual display screen a visual display identifying the specific item and the parameters of the specific item on a priority basis over the sequence of the graphics presentations.

9. In a combination as set forth in claim 8 wherein the identification member is disposed in a housing with the visual display screen and wherein the processor is a first processor and is displaced from the visual display screen and wherein the visual display screen includes a second processor responsive to the information from the first processor for displaying the information representing the specific item, and the parameters of the specific item, on the display screen.

10. In a combination as set forth in claim 8 wherein the specific item has a bar code and wherein the identification member is a bar code scanner and wherein the bar code scanner and the visual display screen are disposed at a checkout counter and wherein a manually operated keyboard is disposed at the checkout counter for identifying the specific item, and the parameters of the specific item, in accordance with a selective one of the manual operation of the keyboard and the scanning of the specific item's bar code by the bar code scanner and for passing this identification to the processor and wherein the processor processes the information from the selective one of the manually operated keyboard and the bar code scanner to identify the specific item and the parameters of the specific item and provides the processed information to the visual display screen for display on the screen.

11. In a combination as set forth in claim 10 wherein the support member and the visual display screen are disposed at a first counter and wherein the bar code scanner is disposed at the first counter.

12. In a combination as set forth in claim 9 wherein the priority encoder provides for the display by the visual display screen of information relating to the specific item for a particular time after the last display of information by the display screen relating to the specific item and then provides for the display of the sequence of the graphics presentations by the visual display screen after the particular time if no additional information relating to another specific item has been provided to the visual display screen during the particular time.

13. In a combination as set forth in claim 10 wherein the specific item is a list of product purchases being made by a customer and the prices of such products and wherein the priority encoder provides, upon a display on the visual display screen of one of the products being purchased by the customer and the price of such product, for the continued display by the visual display screen of information relating to all of the other products being purchased by the customer and the prices of such products and for the display of the total cost of such products and then provides for the display of the sequence of the graphics presentations by the visual display screen.

14. In a combination as set forth in claim 8 wherein
the specific item and the parameters of the specific event are provided on the visual display screen in either alphanumeric or graphics form.

15. A method of providing a visual display of graphics and alphanumeric information, including the steps of:
disposing on a support member a visual display screen constructed to display graphics information and alphanumeric information,
providing for a display on the display screen of a sequence of graphics presentations from a position displaced from the display screen,
providing for a display on the visual display screen of a specific item from a position displaced from the display screen, in an individual one of the graphics form or the alphanumeric form depending upon the specific item,
providing for a priority in the display of the sequence of graphics presentations on the visual display screen,
overcoming the priority to provide for the display of the specific item on the visual display screen when the specific item is presented to the visual display screen, and
providing for the display again of the sequence of graphics presentations on the visual display screen on a priority basis after the display of the specific item has been presented to the display screen.

16. A method as set forth in claim 15 wherein the sequence of the graphics presentations is continually presented to the visual display screen for display by the visual display screen and wherein the specific item is intermittently presented to the visual display screen for display by the visual display screen and wherein the specific item is provided priority over the sequence of the graphics presentations for display on the visual display screen when the specific item is intermittently presented to the visual display screen for display by the visual display screen.

17. A method as set forth in claim 16 wherein the specific item may or may not be related to the sequence of graphics presentations and wherein the sequence of graphics presentations is provided again on a priority basis to the visual display screen for display on the display screen after the specific item has been presented for display on the video display screen.

18. A method as set forth in claim 16 wherein the specific item is provided by a selection and operation of one of a bar code scanner and a keyboard and wherein a processor is responsive to the specific item provided by the selected and operated one of the bar code scanner and the keyboard to provide alphanumeric information to the visual display screen in a form for visual display on the visual display screen.

19. A method as set forth in claim 18 wherein the bar code scanner is disposed at a selective one of a checkout counter in a market and at a housing for the visual display screen at a position removed from the checkout counter and wherein the specific item is a list of items being purchased by a customer and wherein the list of items processed provide an alphanumeric identification of the items and the price of the items and a total cost of the items when the bar code scanner is at the checkout counter and wherein the specific item is a single item when the visual display screen is disposed at the housing displaced from the checkout counter.

20. A method as set forth in claim 14 wherein the specific item is provided on an alphanumeric basis by a selected one of a bar code scanner and a keyboard and wherein the alphanumeric information generated by the selected one of the bar code scanner and the keyboard is transmitted by the keyboard to a processor and wherein the processor processes the alphanumeric information from the selected one of the keyboard and the bar code scanner and sends the processed alphanumeric information from the bar code scanner to the keyboard when the information is provided by the bar code scanner and wherein the keyboard provides for the display of the alphanumeric information by the visual display screen.

21. A method as set forth in claim 16 wherein the specific item constitutes products being purchased by a customer and wherein the products are processed to provide alphanumeric information identifying the products and the prices of the products and wherein the specific item includes the total cost in alphanumeric form of the products being purchased by the customer, and wherein the priority in the display of the sequence of the graphics presentations is overcome during the time that the alphanumeric information is generated for the products being purchased by the customer.

22. A method as set forth in claim 15 wherein alphanumeric information is provided by a bar code scanner disposed on the visual display screen and wherein the alphanumeric information is provided relating to an item scanned by the bar code scanner and wherein the alphanumeric information from the bar code scanner is transmitted to a processor for processing by the processor and wherein the processed alphanumeric information is transmitted by the processor to the visual display screen for visual display on the visual display screen.

23. A method as set forth in claim 22 wherein the priority in the display of the sequence of the graphics presentations on the visual display screen is overcome for a particular period of time after the alphanumeric information is provided by the bar code scanner to the processor and wherein the alphanumeric information is displayed on the visual display screen during the particular period of time and wherein the priority in the display of the sequence of the graphics presentations is resumed after the particular period of time unless alphanumeric information is provided before the end of the particular period of time relating to another item scanned by the bar code scanner.

24. A method of presenting a visual display to a customer in a market of graphics and alphanumeric information, including the steps of:
  disposing a visual display screen to provide for the presentation of the visual display to the customer,
  providing for a presentation to the visual display screen from a position displaced from the visual display screen of graphics information representing advertisements and promotions of products for sale in the market,
  providing for a presentation to the visual display screen from a position displaced from the display screen of alphanumeric information identifying specific products in the market and the prices of such products,
  providing for the presentation of the alphanumeric information to the visual display screen in accordance with the operation of a selective one of a bar code scanner and a keyboard,
  providing for the display on the display screen, in accordance with the operation of the selective one of the bar code scanner and the keyboard, of the alphanumeric information presented to the visual display screen and otherwise providing for the display of the graphics information on the visual display screen, and
  providing a particular time for a transition from the display of the alphanumeric information on the visual display screen to the display of the sequence of the graphics presentations on the visual display screen.

25. A method as set forth in claim 24 including the step of:
  when the alphanumeric information is provided of products being purchased by the customer, providing for the continued display of the alphanumeric information on the display screen until the products and the prices of the products have been displayed and the prices of the products have been totaled, and thereafter providing for the display of the sequence of the graphics presentations on the visual display screen.

26. A method as set forth in claim 24, including the step of: when the alphanumeric information is provided by the operation of the bar code scanner relating to products being contemplated for purchase by the customer, providing for the continued display of the alphanumeric information on the display screen for a particular period of time after the operation of the bar code scanner, and thereafter providing for the display of the sequence of the graphics presentations on the visual display screen unless the alphanumeric information for another product has been presented to the display screen during the particular period of time.

27. A method as set forth in claim 25 wherein a processor is provided for processing the alphanumeric information generated by the selective one of the bar code scanner and the keyboard and for introducing the processed alphanumeric information to the visual display screen for display by the visual display screen.

28. A method as set forth in claim 25 wherein when the bar code scanner and the keyboard are provided at a checkout counter, wherein the alphanumeric information generated by the bar code scanner and the keyboard are transmitted by the keyboard to the processor for processing by the processor and wherein the processor transmits the processed alphanumeric information through the keyboard to the visual display screen for visual display on the visual display screen.

29. A method of providing a visual display, including the steps of:
  providing a visual display screen constructed to display graphics information and alphanumeric information,
  providing for a display from a position displaced from the display screen of a sequence of graphics presentation on the visual display screen,
  providing a specific item from a position displaced from the display screen,
  providing for a display of the specific item on the visual display screen,
  providing a priority for the display of the specific item on the visual display screen relative to the display of the sequence of the graphics presentations,
  maintaining the priority, for a particular period of time after the provision of the specific item, in the display of the specific item on the visual display screen relative to the display of the sequence of the graphics presentations, and
  providing for the display of the sequence of graphics presentations on the visual display screen after the particular period of time unless another specific item is presented for display in the visual display screen before the end of the particular period of time.

30. A method as set forth in claim 29 wherein the specific item is related to the sequence of the graphics presentations.

31. A method as set forth in claim 29 wherein the specific item is unrelated to the sequence of the graphics presentations.

32. A method as set forth in claim 29 wherein the display of the specific item on the visual display screen is alphanumeric.

33. A method as set forth in claim 29 wherein the display of the specific item on the visual display screen is in graphics form.

34. A method as set forth in claim 29 wherein the specific item is a single item that a customer in a market is interested in purchasing.

35. A method as set forth in claim 29 wherein
  the specific item comprises a plurality of items that a customer is purchasing in a market.

36. A method as set forth in claim 29 wherein
  the sequence of the graphical presentations comprises a sequence of advertisements and promotions of products in a market and wherein the specific item comprises an alphanumeric identification of a particular product, and the price of the particular product, that a customer is interested in purchasing in the market.

37. A method as set forth in claim 29 wherein the sequence of graphical presentations comprises a sequence of advertisements and promotions of products in a market and wherein the specific item comprises an alphanumeric identification of a list of products, and the prices of the products, being purchased by the customer in the market and the total price of the products being purchased by the customer.

\* \* \* \* \*